United States Patent [19]

Horst

[11] Patent Number: 5,386,162
[45] Date of Patent: Jan. 31, 1995

[54] REDUNDANT SWITCHED RELUCTANCE MOTOR

[75] Inventor: Gary E. Horst, St. Louis County, Mo.

[73] Assignee: Emerson Electric Co., St. Louis, Mo.

[21] Appl. No.: 43,294

[22] Filed: Apr. 6, 1993

Related U.S. Application Data

[63] Continuation-in-part of Ser. No. 884,149, May 18, 1992, Pat. No. 5,239,217.

[51] Int. Cl.[6] .......................... H02K 5/24; H02K 1/24
[52] U.S. Cl. ........................................ 310/51; 310/269
[58] Field of Search ................. 310/51, 168, 254, 261, 310/269

[56] References Cited

U.S. PATENT DOCUMENTS

| | | | |
|---|---|---|---|
| 4,186,316 | 1/1980 | Singh | 310/49 R |
| 4,998,052 | 3/1991 | Erdman et al. | 318/701 |
| 5,111,096 | 5/1992 | Horst | 310/168 |
| 5,233,254 | 3/1992 | Fisher et al. | 310/261 |
| 5,239,217 | 8/1993 | Horst | 310/51 |
| 5,260,620 | 11/1993 | Morrill | 310/185 |

Primary Examiner—Steven L. Stephan
Assistant Examiner—Judson H. Jones
Attorney, Agent, or Firm—Polster, Lieder, Woodruff & Lucchesi

[57] ABSTRACT

A multiple phase switched reluctance motor (30). A stator assembly (32) has a plurality of inwardly salient teeth (34a–34l) terminating at a central bore (36) and at least one redundant pole set for each motor phase. A rotor assembly (38) disposed for rotation in the bore has a plurality of rotor teeth (42a–42d). The number of rotor teeth is proportional to the number of stator teeth. The pole redundancy helps distribute ovalizing forces on the motor assembly. This lessens the effect of these forces and reduces motor noise produced by the assembly in response to the forces. The stator may have multiple teeth per pole and the rotor a multiple of the determined rotor teeth. The number of rotor teeth exceeds the number of stator teeth so the rotor teeth overlap the stator teeth. This improves starting torque in a desired direction of motor rotation. The ratio between stator poles and rotor poles includes the following for single tooth per pole motor constructions 6(n):2(n); 6(n):4(n); 6(n):8(n); 8(n):6(n); 8(n):10(n); where n is a positive whole integer having a value of 1 or 2 for some motor applications, and a higher value for certain ratios for other applications. In addition, in some motor constructions, the rotor teeth are formed to provide dual air gaps between the stator and rotor assemblies.

20 Claims, 8 Drawing Sheets

REDUNDANT SWITCHED RELUCTANCE MOTOR

BACKGROUND OF THE INVENTION

This application is a continuation-in-part of U.S. patent application Ser. No. 07/884,149, filed May 18, 1992 now U.S. Pat. No. 5,239,217.

This invention relates to switched reluctance motors and, more particularly, to a switched reluctance motor having redundant poles to reduce the "ovalizing" effects on the motor's structure and the noise generated thereby.

In U.S. patent application Ser. No. 747,855, which is assigned to the same assignee as the present application, there is disclosed a shifted pole, single phase variable reluctance motor. One of the problems addressed by the invention disclosed in this co-pending application is noise generated by motor "ovalizing". This problem arises because the motor's stator and rotor assemblies are usually installed in the same frame. As a result, mechanical forces are created within the assembly as the rotor and stator poles come into and go out of alignment. Thus, when poles align, the assembly is subjected to an inward (pulling) force. When the poles reach 90 degrees out of alignment, an outward (pushing) force is produced. The consequent distortion changes the normal circular (in cross-section) motor structure into an oval shape. Flexure of the motor structure, caused by this distortion, produces noise which can reach undesirably high levels.

Figure 3:
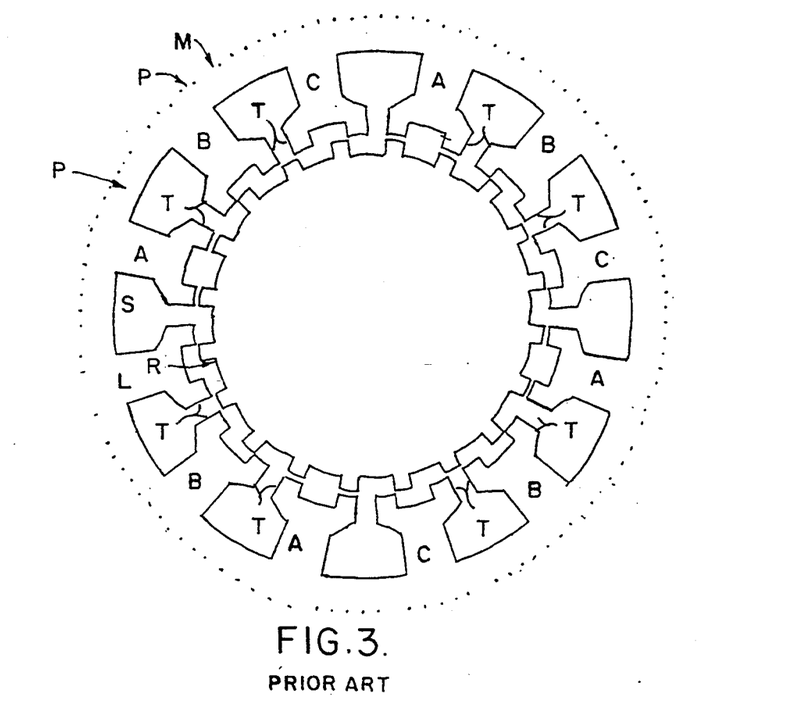
FIG. 3 is an elevational view of a prior art three-phase motor having cantilevered stator teeth.
Figure 4:
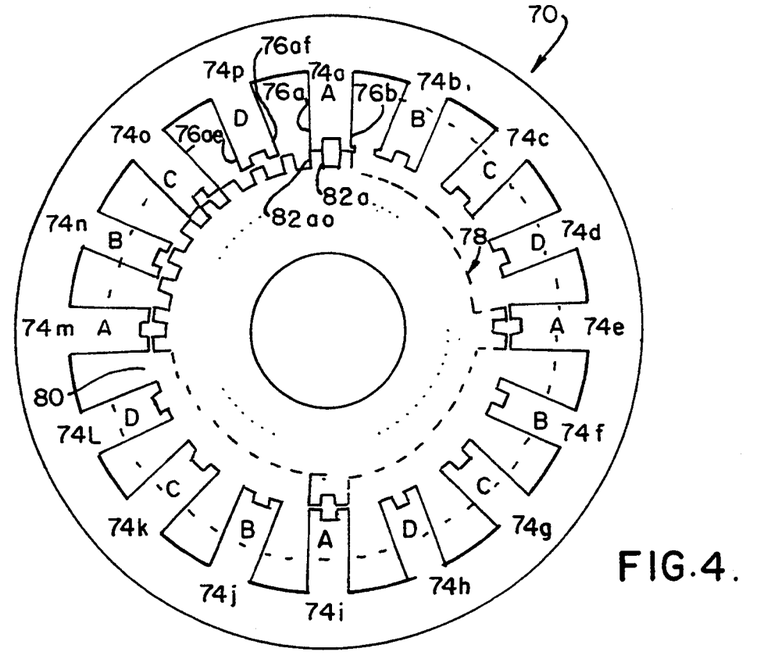
FIG. 4 represents a four-phase motor made in accordance with the present invention and having four poles per phase and two teeth per pole, the stator/rotor teeth ratio for the motor being 32:40 ((8:10)×4)

The structure disclosed in the co-pending application helps alleviate this problem in a single phase, unidirectional motor. The problem, however, exists for other type motors as well. In this regard, other approaches to solving the ovalizing problem have been used. See, for example, U.S. Pat. No. 4,998,052. The present invention advances the solution to the ovalizing problem addressed by applicant's own previous work and that disclosed in this '052 patent so that a solution to this problem is now available for poly-phase, bi-directional switched reluctance motors as well as for variable reluctance motor's of the type described in the co-pending application. Further, with regard to the switched reluctance motor disclosed in this patent, it has a stator/rotor pole ratio selected from ratios of 6:2, 6:4, 6:8, or 8:6, 8:10 with the actual number of poles being a multiple of two or more times those numbers. I.e., the actual number of stator/rotor teeth are 24 and 32 respectively, as shown in FIG. 3 of the patent, and 32 and 40, as shown in FIG. 4. While these motor constructions provide switched reluctance motor which performs in accordance with the teachings of this patent, there are other motor constructions which are less noisy and better starting.

SUMMARY OF THE INVENTION

Among the several objects of the present invention may be noted the provision of a poly-phase, bi-directional, general purpose switched reluctance motor; the provision of such a motor in which the effects of ovalizing are substantially reduced; the provision of such a motor which is an N-pole motor and which has redundant pole sets for each motor phase; the provision of such pole set redundancy to minimize the forces created and exerted on a motor assembly when the rotor and stator poles align and when they are 90 degrees out of alignment; the provision of such a motor in which the stator is constructed without cantilevered stator teeth thereby reducing motor noise; the provision of such a motor having a rotor tooth arrangement which facilitates starting the motor in a desired direction; and, the provision of such a motor having a stator/rotor teeth ratio which one of the following ratios 6(n):2(n); 6(n):4(n); 6(n):8(n); or 8(n):6(n); 8(n):10(n), where n is a positive whole integer, a motor having one of these stator/rotor tooth ratios being less noisy and better starting than motors having other ratios. In some motor applications, n will have a value of 1 or 2. In other motor applications, the value of n could be higher.

In accordance with the invention, generally stated, a multiple phase switched reluctance motor assembly comprises a stator assembly having a plurality of inwardly salient teeth terminating at a central bore. A rotor assembly is disposed for rotation in the central bore and also has a plurality of teeth. The stator assembly has at least one redundant pole set for each motor phase and the rotor has a corresponding proportional number of opposed teeth. The redundancy of the poles distributes the ovalizing forces on the motor assembly to lessen the effect of these forces and reduce motor noise produced by the assembly in response to such forces. The ratio between stator teeth and rotor teeth for the motor may be one of the following ratios 6(n):2(n); 6(n):4(n); 6(n):8(n); 8(n):6(n); or 8(n):10(n), where n is a positive, whole integer having a value of 1, 2, or in some constructions 3, or 4.

Other objects and features will be in part apparent and in part pointed out hereinafter.

BRIEF DESCRIPTION OF THE DRAWINGS

Corresponding reference characters indicate corresponding parts throughout the drawings.

DESCRIPTION OF PREFERRED EMBODIMENTS

Figure 1:
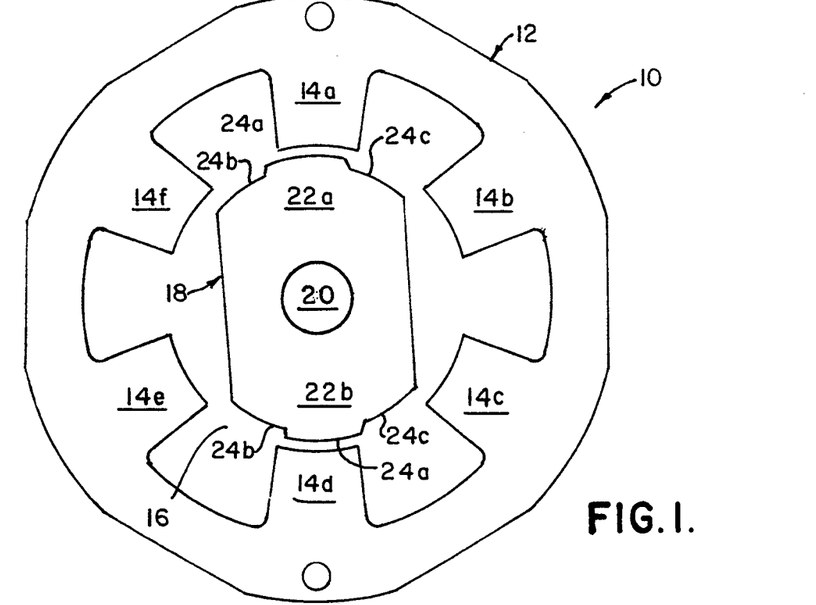
FIG. 1 represents a switched reluctance motor of the present invention which is a three-phase motor having a stator/rotor pole ratio of 6:2.

Referring to the drawings, a switched reluctance motor is indicated generally 10 in the drawings. The motor has a stator assembly 12 which includes a plurality of inwardly salient teeth, for example, the six teeth 14a-14f shown in FIG. 1. The teeth terminate at a central bore 16 in which a rotor assembly 18 is disposed for rotation. Rotor 18 is mounted for rotation on a central shaft 20 and includes a plurality of opposed teeth, two such teeth 22a-22b being shown in the drawings. Motor 10 is a three-phase motor (phases A, B, and C as indicated in FIG. 1) having six poles. The stator teeth 14a, 14d are associated with one phase, teeth 14b, 14e with a second phase, and teeth 14c,14f with the third phase. Stator coils (not shown for drawing clarity) are located between the stator teeth and each tooth is activated by the coils when they are energized. Further, each rotor tooth has a first section 24a defining an air gap between the rotor and stator assemblies. To either side of section 24a are step gap sections 24b, 24c respectively. Each of these sections defines a wider air gap between the stator and rotor and facilitates starting the motor in either direction by increasing the torque in the desired direction of rotation. These stepped air gaps also serve to distribute normal forces which helps reduce ovalization.

Figure 6A:
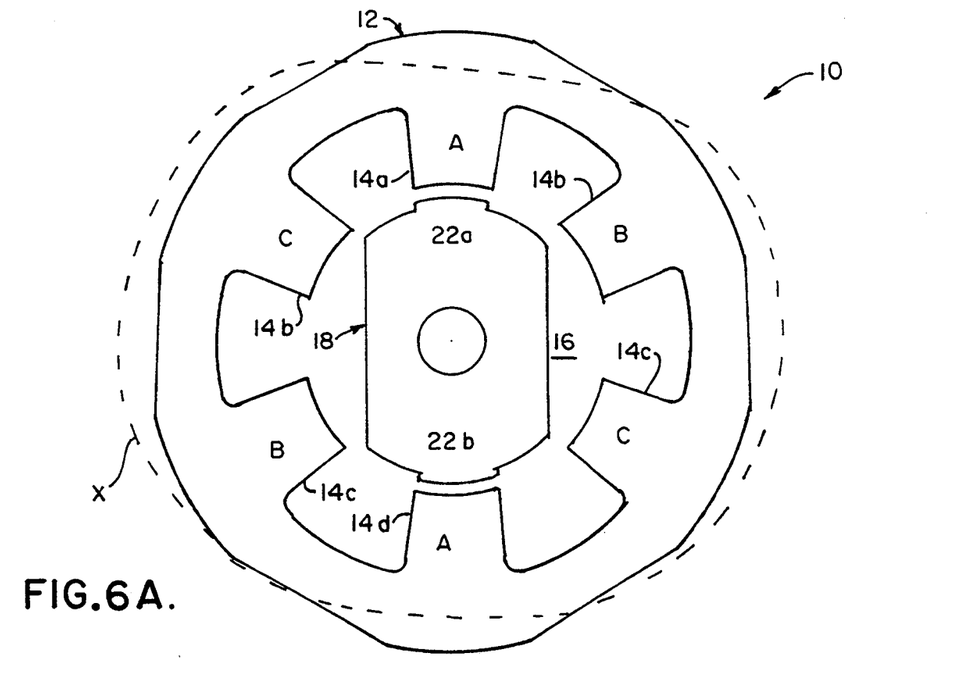
FIGS. 6A and 6B respectively illustrate the improvement in reducing ovalizing in a 6:2 motor (FIG. 6A) as compared with a motor constructed in accordance with the present invention which is a 12:4 motor ((6:2)×2)

Referring to FIG. 6A, motor 10 is again shown. The dashed line X represents the distortion of the motor structure produced by the "ovalizing" effect on the motor. As seen in FIG. 6A, rotor teeth 22a, 22b are aligned with the phase A teeth 14a, 14d. When the teeth are aligned as shown, an inward, or compressive force is produced on the motor assembly at the aligned pole positions. An outward force is concurrently produced at the other poles. As the rotor teeth sweep around bore 16, consecutively aligning with the phase B and phase C poles, the forces on the motor represented by line X follow them. Since the motor typically rotates at thousands of revolutions per minute (rpm) there is a constant flexing of the motor structure. This flexure produces an undesirable, high level noise which needs to be reduced or eliminated. It will be understood that this ovalizing effect occurs irrespective of the direction of motor rotation.

Figure 2:
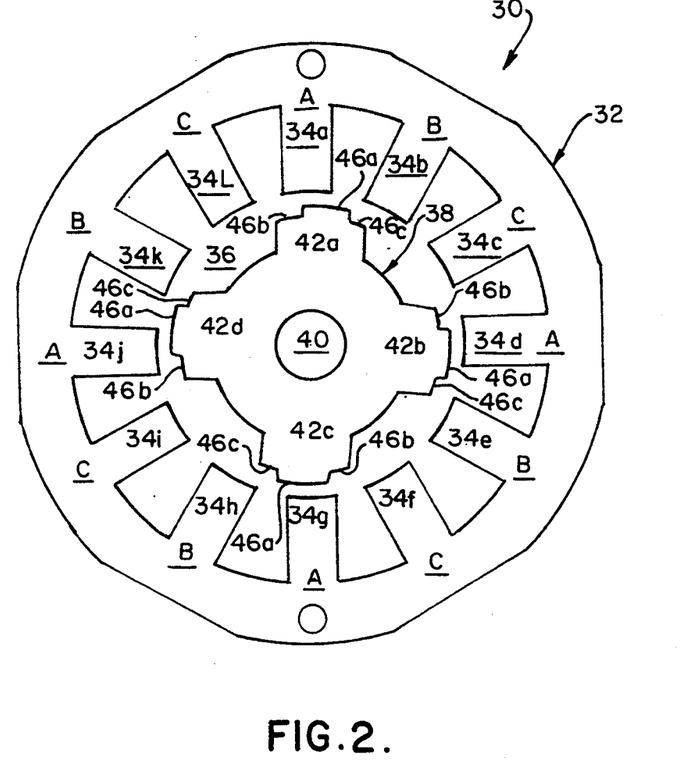
FIG. 2 represents three-phase motor similar to that of FIG. 1, but with redundant poles, so the stator/rotor pole ratio is 12:4 ((6:2)×2)

Referring to FIG. 2, a poly-phase, bi-directional switched reluctance motor of the present invention is indicated generally 30. This motor has a stator assembly 32 which includes a plurality of inwardly salient teeth, there now being twelve such teeth 34a-34l. These teeth terminate at a central bore 36 in which a rotor assembly 38 is disposed for rotation. As before, the rotor assembly is mounted for rotation on a central shaft 40. Whereas rotor 18 had two teeth, rotor assembly 38 has four teeth 42a-44d, these being evenly spaced about the rotor. Motor 30, like motor 10 is a three-phase motor (the phases A, B, and C being indicated in FIG. 2). It is an important aspect of this invention that stator assembly 32 has at least one redundant pole set for each motor phase. The redundancy of the poles helps distribute the ovalizing forces on the motor assembly, this distribution lessening the effect of the forces on the assembly. This, in turn, reduces the motor noise produced by the assembly in response to such forces.

For the stator assembly configuration of FIG. 2, it is also important that rotor 38 have a number of teeth which is proportional to the number of stator teeth, including the teeth for the redundant poles. Motor 30 has 12 stator poles, six of which are redundant. Each stator pole has one associated stator tooth. The relationship between the number of stator teeth and rotor teeth is given by the equation:

$$\text{Rotor teeth} = \frac{\text{Stator teeth (including redundant poles)}}{ph}$$

where ph is the number of motor phases. Thus, since motor 30 is a three phase motor having 12 stator poles and 12 stator teeth, the number of rotor teeth are the 4 teeth 42a-42d shown in FIG. 2.

Figure 6B:
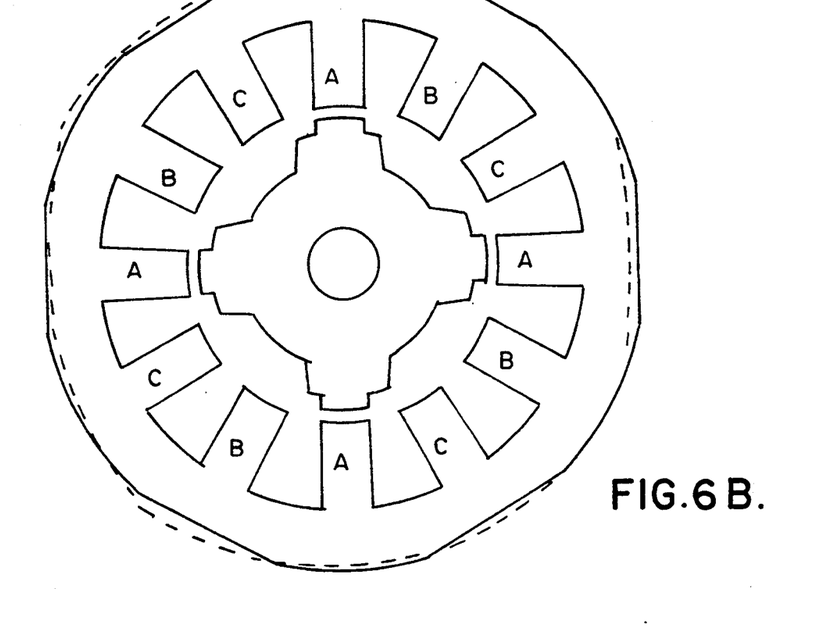

Referring to FIG. 6B, the redundant pole construction of the present invention is important for the normal operation of the motor in that it reduces the ovalizing effect on the motor. Whereas in the motor 10 configuration, there is a peak force (inwardly or outwardly) every 60 degrees, in motor 30, this occurs every 30 degrees. The intensity of the forces exerted on motor 30 can be as great as those exerted on motor 10. However, since these maximum forces are spread out over four poles in motor 30 rather than the two poles of motor 10, their effect is more distributed around the motor assembly. Thus, as shown in FIG. 6B, while there is an ovalizing force still acting on the motor assembly, the distribution produced by the additional, or redundant, poles is seen to substantially lessen the flexing of the motor assembly. As a result, the motor noise resulting from the constant flexure is significantly less.

As with rotor 18 of motor 10, teeth 42a-42d of rotor 38 each has a first section 46a defining an first air gap with respect to the stator assembly 42. Each tooth further has a second section 46b on one side of section 46a. Section 42b defines a second and larger air gap with respect to the stator assembly. Each tooth further has a third section 46c on the opposite side of the section 46a, with the air gap defined by section 46c corresponding to that defined by second section 46b. The respective step gaps produced by sections 46b, 46c improve starting torque for starting the motor in a preferred direction of rotation.

Figure 5:
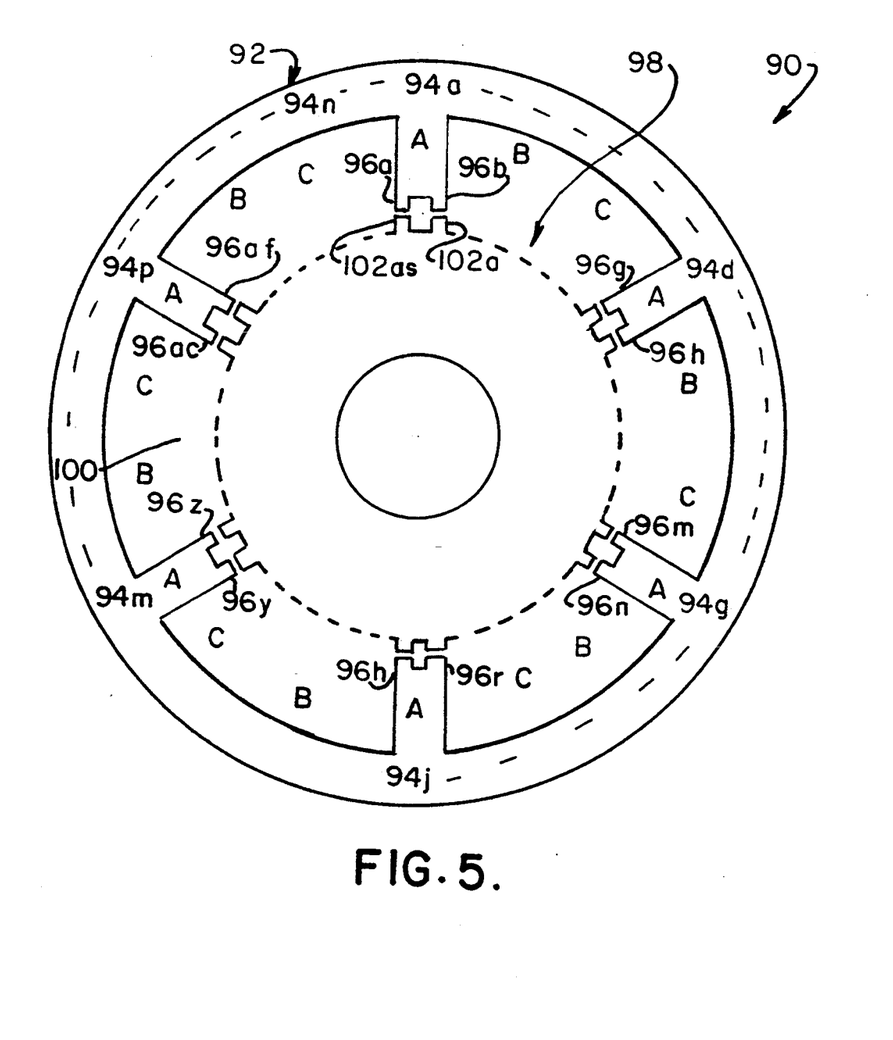
FIG. 5 represents a three-phase motor made in accordance with the present invention and having size poles per phase and two teeth per pole, the stator/rotor pole ratio for the motor being 18:6 ((6:2)×3)

It will be understood that while three phase motor 30 has one redundant stator pole for each stator pole of three phase motor 10; and, in accordance with the above given formula, 4 rotor teeth, the motor could have additional redundant poles. Thus, for example, the motor could have 18, or 24, or 30 poles. According to the formula, for a three phase motor, the rotor would have 6, 8, or 10 teeth respectively, if there is one stator tooth for each stator pole. Where the ratio between stator and rotor teeth is thus 6:2, 12:4, 18:6, etc., for a three phase motor; for a four phase motor, the respective ratios are 8:2, 16:4, 24:6, etc. The more redundant stator poles and rotor teeth which can be designed into a motor, the more the ovalizing forces are distributed and the less their effect. Accordingly, the lower the noise caused by this phenomenon. As a practical matter, the limiting factor on the number of redundant poles are space limitations of the motor; for example, the space between adjacent stator teeth needed to insert coils into the stator assembly. A 12:4 three-phase motor is shown in FIGS. 2, 3B, and 6B; while an 18:6 three-phase motor is shown in FIG. 5.

Referring to FIG. 3, a prior art three-phase motor M is depicted which has a rotor R and a stator S. The stator of motor M has multiple teeth T for each stator pole P. The motor also has a redundancy of six poles. As is conventional in this prior art motor, the stator teeth are cantilevered off of each of the twelve poles. In operation, when the compression or normal forces act on these teeth, they flex inwardly. This produces noise. And, the more the teeth are cantilevered, the more susceptible they are to movement, and to noise generation.

Figure 3A:
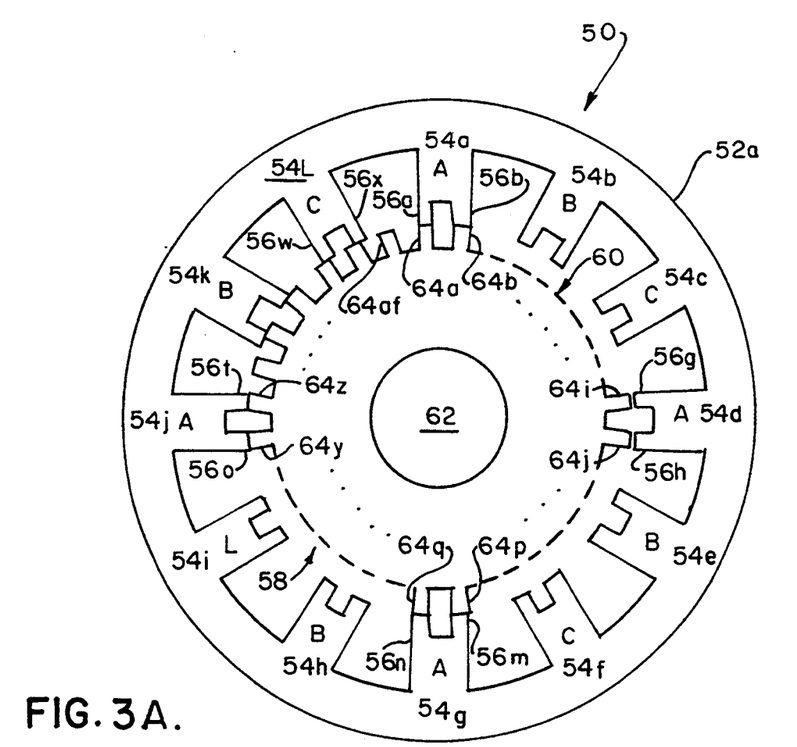
FIGS. 3A and 3B represent three-phase motors made in accordance with the present invention, each motor having four poles per phase and two teeth per pole, the stator/rotor teeth ratio of each motor having 24:32 ((6:8)×4)
Figure 3B:
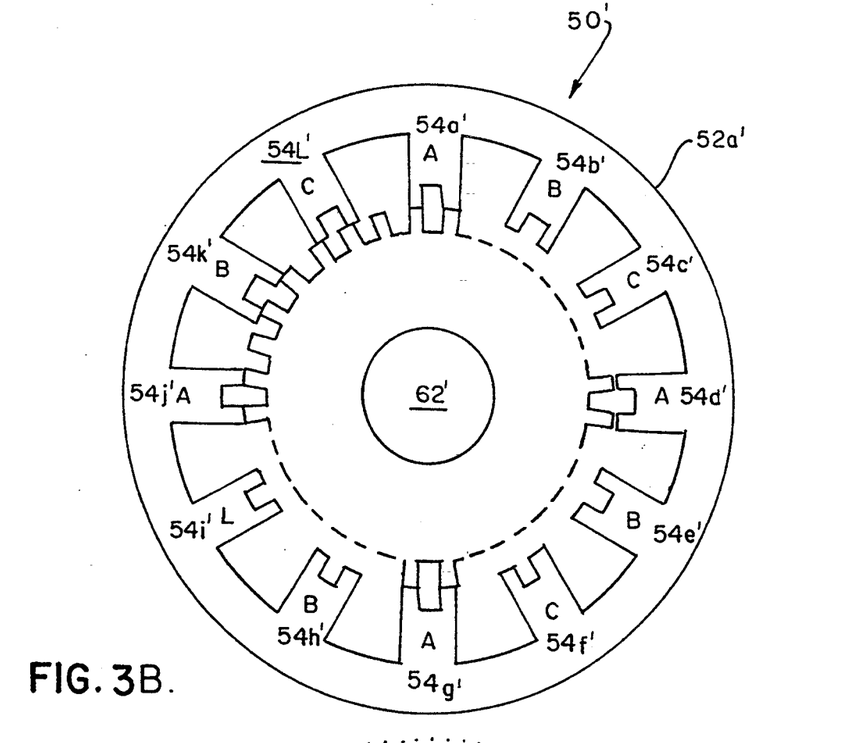

Referring now to FIG. 3A, a motor 50 is shown in which there are a plurality of stator teeth for each stator pole. Motor 50 is a three phase motor and first includes a stator assembly 52 having 12 stator poles 54a–54l, six of which are redundant poles. Now, however, each stator pole has two associated teeth. The stator teeth are teeth 56a–56x. The stator assembly has a central bore 58 in which a rotor assembly 60 mounted on a shaft 62 is disposed for rotation. Because motor 50 has two teeth per stator pole, the number of rotor teeth, calculated in accordance with the previous formula, is 8. However, unlike the rotor construction of the previous embodiment of the present invention, rotor assembly 60 has a multiple number of the calculated number of rotor teeth. As shown in FIG. 3, the rotor has assembly has four times the number of calculated teeth, or 32 rotor teeth 64a–64af. It should be noted that the stator poles and teeth of motor 50 eliminate the cantilever design of motor M, thereby to reduce motor noise.

The rotor teeth of motor 50 are spaced so that they overlap a stator pole. This is done to increase the amount of starting torque in the direction of desired motor rotation. For motor 50, the spacing between rotor teeth is given by the formula:

$$\frac{360 - ((360/N) * ph * (p/ph))}{ph * (p/ph)} =$$

$$((360/N) * X) \left(\frac{360}{ph * (p/ph)}\right) * 0.5$$

where:
360 is the number of degrees in a circle,
N is the number of rotor teeth,
ph is the number of phases,
p/ph is the number of poles per phase, and
X is a ratio of tooth width to tooth pitch and has a desired range of 0.3–0.4.

For motor 50, there are 3 phases, 4 poles per phase, and 32 rotor teeth. Substituting these values into the above formula yields:

$$\frac{360 - ((360/32) * 3 * 4)}{3 * 4} = ((360/32) * .35)$$

for which the calculated spacing is 14.81 degrees. Using the approximation formula:

$$\left(\frac{360}{3 * 4}\right) * 0.5$$

provides a calculated spacing of 15.00 degrees.

In addition, the proper number of rotor teeth is determined in accordance with the formula; i.e.:

$$\frac{32}{4} = 8 = \text{Integer which satisfies } \frac{N}{p/ph} = \text{Integer}$$

Referring now to FIG. 3B, motor 50' is a three phase motor with four poles per phase.

This motor is similar to motor 50 except that instead of having 32 rotor teeth, motor 50' has 28 rotor teeth 64a'–64ab'. Applying the previously given formulas to the conditions of motor 50',
N=28
ph=3
p/ph=4, and $$\frac{N}{p/ph} = \text{integer, or } \frac{28}{4} = 7$$

which satisfies this condition.
Next, $$\frac{360 - ((360/28) * 3 * 4)}{3 * 4} = (360/28) * .35) = 12.64 \text{ degrees}$$

using the approximation, $$\frac{360}{3 * 4} * 0.5 = 15.00 \text{ degrees}$$

12.64 is not approximately equal to 15.7

What this means is that motor 50' will work, but the copper space will be less than preferable. As a practical design consideration, there should be a 50/50 ratio between the space available for copper and the tooth space. This condition is satisfied, for example, in motor 50 of FIG. 3A.

As a practical matter, the number of rotor teeth is again a function of the ability to fabricate a rotor assembly with a large number of teeth. In a larger size motor it may be more practical to have a larger multiple of rotor teeth than in a smaller size motor. Clearly, the spacing between the rotor teeth will be a function of the number of teeth.

Referring to FIG. 4, a four phase motor 70 has a stator assembly 72 with 16 poles 74a–74p. As with motor 50, each stator pole has with two teeth per each pole. Consequently there are 32 stator teeth, these being designated 76a–76af respectively. The motor further has a rotor assembly 78 disposed for rotation in a central bore 80 of the stator assembly, and having forty rotor teeth 82a–82ao. Using the formula given previously:

$$\text{Rotor teeth} = \frac{40}{4} = 10, \text{ which is an integer}$$

As with motor 50, motor 70 has a multiple of the required number of rotor teeth; for example 40 rotor teeth 82a–82ao respectively. Applying the spacing formula set forth above:

$$\frac{360 - ((360/40) * 4 * 4)}{(4 * 4)} - ((360/40) * .350 \frac{360}{4*4} * (0.5)$$

The calculated spacing between stator teeth is now 10.35 degrees, and the approximation is 11.25 degrees. Note that the calculated spacing is less than the approximation, which is acceptable. If, for example, motor 70 had 44 rotor teeth (the next higher number which satisfies the rotor tooth integer requirement), the calculated spacing becomes 11.45 degrees which is greater than the approximation, which is not acceptable.

Referring to FIG. 5, a three phase motor 90 has a stator assembly 92 with 18 poles 94a–94r. As with motors 50 and 70, each stator pole has with two teeth per each pole. Consequently there are 36 stator teeth, these being designated 96a–96aj respectively. Motor 90 includes a rotor assembly 98 disposed for rotation in a central bore 100 of the stator assembly. The rotor assembly has forty-five rotor teeth 102a–102as. Applying the formula for the number of rotor teeth:

$$\text{Rotor teeth} = \frac{45}{3} = 15, \text{ which is an integer}$$

As with motors 50 and 70, motor 90 has a multiple of the required number of rotor teeth; for example, the 45 rotor teeth 102a–102as. Applying the spacing formula:

$$\frac{360 - ((360/45) * 3 * 6)}{(3 * 6)} - ((360/45) * .35) = 9.2 \text{ degrees}$$

The calculated approximation between rotor teeth for motor 90 is 10.00 degrees.

It will be apparent to those skilled in the art that other constructions are possible depending upon the degree to which the stator and rotor designs for a motor should account for the ovalizing effect on the motor assembly, the removal or elimination of cantilevered stator teeth, and the resultant noise created as a result thereof. The various motor constructions shown in the drawing figures are exemplary only and are used to illustrate the fact that various levels of redundancy are possible with use of non-cantilevered teeth in a stator assembly design. Thus, three phase motors 30 and 50 exhibit a multiple of 2 for their redundancy; while motor 70 illustrates a multiple of 2 for the redundancy in a four phase machine, and motor 90 a multiple of 3 redundancy in a three phase machine.

Figure 9:
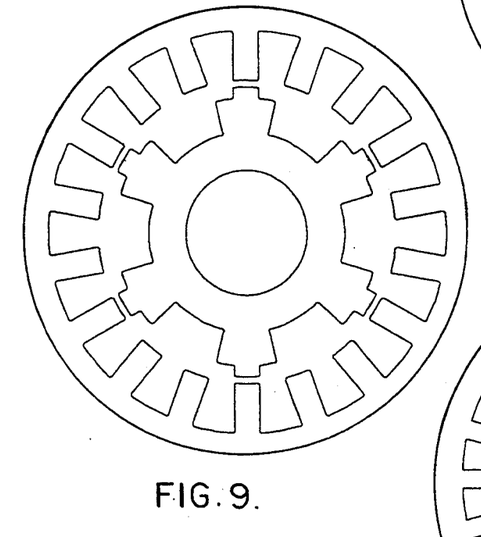
FIG. 9 represents another motor construction wherein the stator/rotor pole ratio is 18:6 ((6:2)×3)
Figure 10:
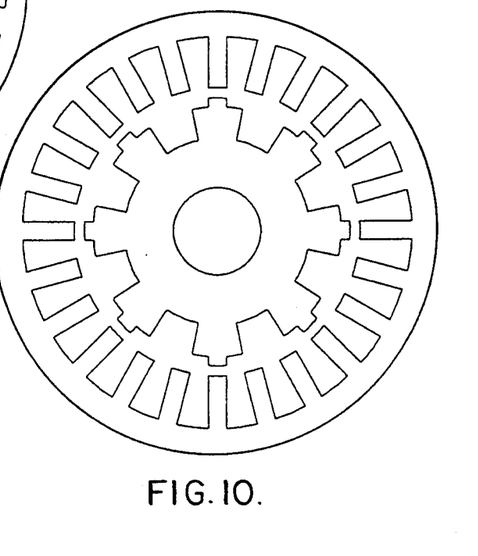
FIG. 10 represents yet another motor construction wherein the stator/rotor pole ratio is 24:8 ((6:2)×4)
Figure 15:
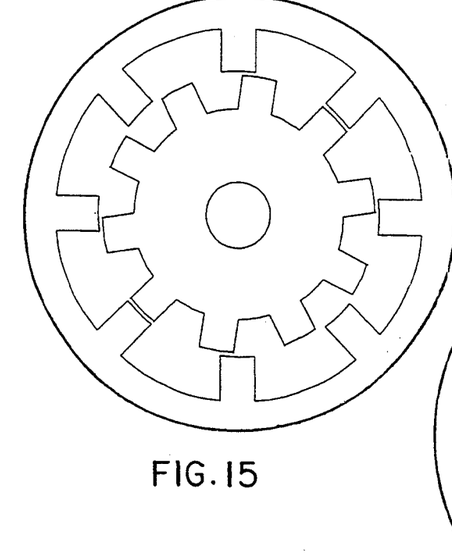
FIG. 15 represents a motor construction having a stator/rotor pole ratio of 8:10.
Figure 16:
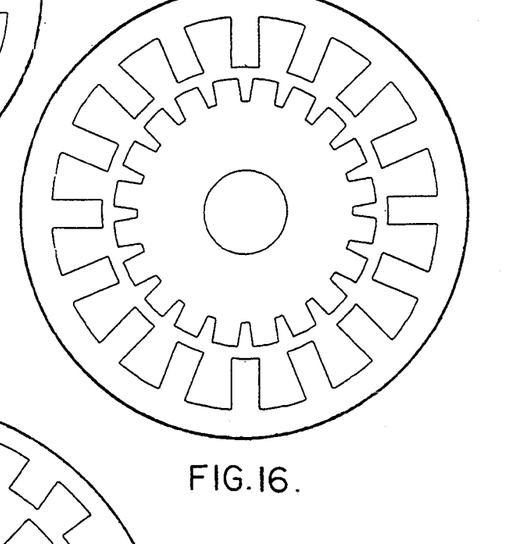
FIG. 16 represents a motor construction having a stator/rotor pole ratio of 16:20 ((8:10)×2); and, FIG. 17 represents another 16:20 motor construction with the stator assembly positioned inside the stator assembly.
Figure 17:
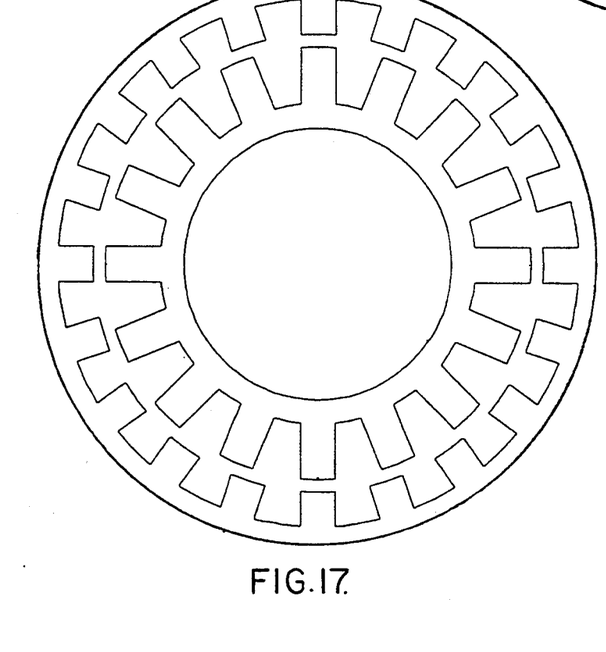

With regard to these motor constructions, a number of them have both improved starting characteristics, and reduced noise. One such construction is the 6:2 construction of FIG. 1, where 6 is the number of stator poles, and 2 the number of rotor poles. A similar construction shown in FIG. 2, is a 12:4 construction; while in FIGS. 9 and 10, an 18:6 and 24:8 construction are respectively shown. These constructions all represent a 6(n):2(n) construction where n is a positive whole integer having a value of 1, 2, 3, or 4. An 18:6 (n=3) construction is shown in FIG. 9, and a 24:8 (n=4) construction in FIG. 10. Similarly, a 32:40 construction is shown in FIG. 4. This is an 8(n):10(n) construction, where n=4. An 8:10 motor is also shown in FIG. 15, and 16:20 (n=2) construction in FIGS. 16 and 17. In FIG. 17, the rotor is located outwardly of the stator.

Figure 7:
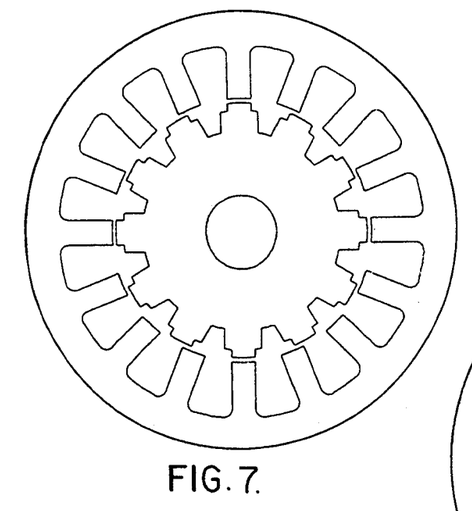
FIG. 7 represent another motor construction with stator/rotor pole ratio of 16:12 ((8:6)×2), the rotor teeth forming dual air gaps with the stator assembly.
Figure 8:
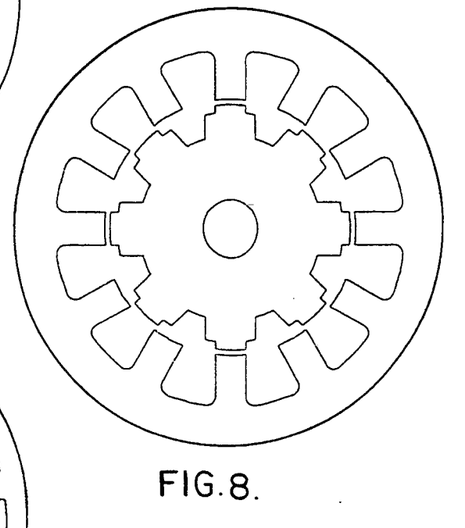
FIG. 8 represents yet another motor construction with a stator/rotor pole ratio of 12:8 ((6:4)×2), the rotor teeth forming dual air gaps with the stator assembly.
Figure 11:
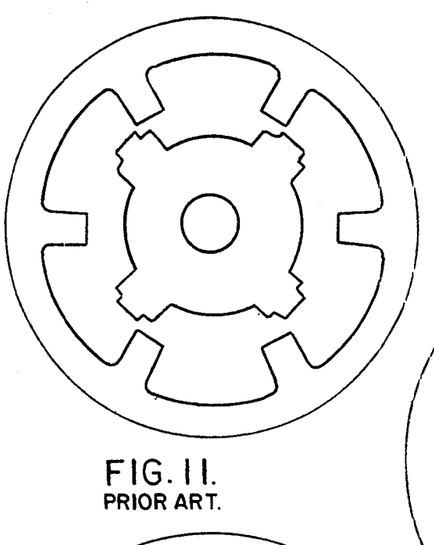
FIG. 11 represents a prior art motor construction having a stator/rotor pole ratio of 6:4 except with dual air gaps which is not prior art.
Figure 12:
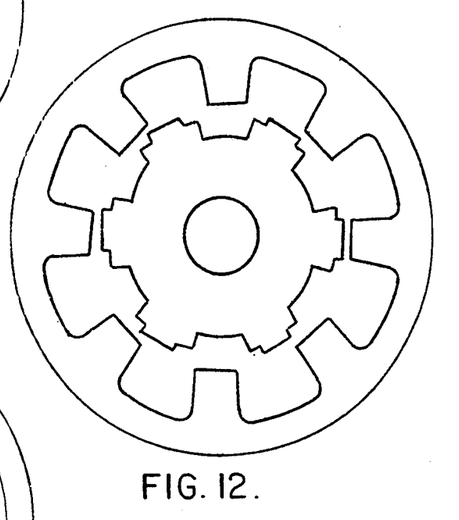
FIG. 12 represents a motor construction having a stator/rotor pole ratio of 8:6 except with dual air gaps which is not prior art.
Figure 13:
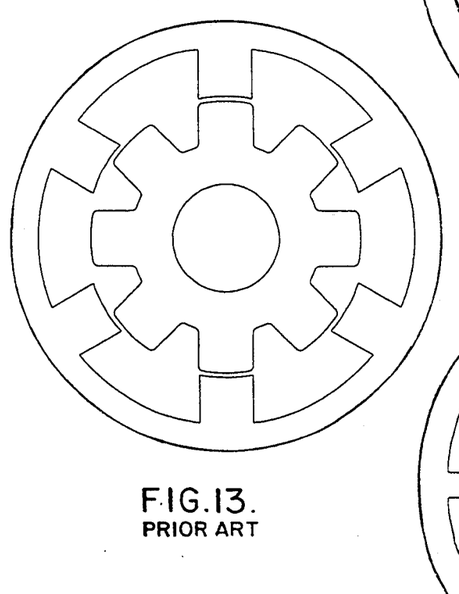
FIG. 13 represents a prior art motor construction having a stator/rotor pole ratio of 6:8.
Figure 14:
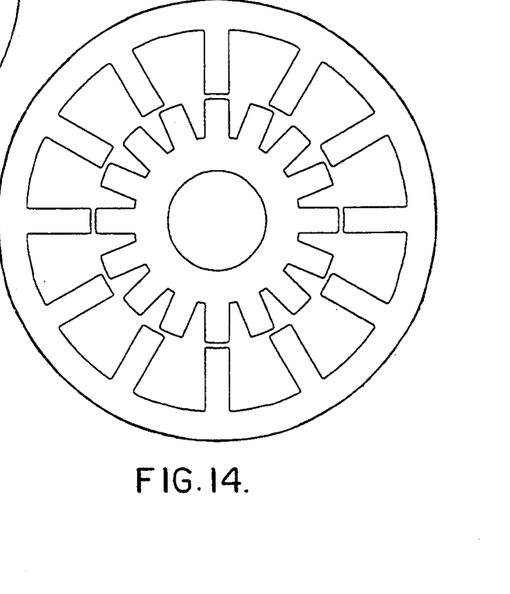
FIG. 14 presents a motor construction having a stator/rotor pole ratio of 12:16 ((6:8)×2)

In addition to the 6:2 and 8:10 constructions, another motor construction exhibiting the starting improvement and noise reduction capability has a 6:4 or 12:8 stator/rotor pole rate. A 6:4 construction is shown in FIG. 11, and a 12:8 construction in FIG. 8. This latter is a 6(n):4(n) ratio, where n=2. A third motor construction has an 8:6 or 16:12 stator/rotor pole ratio. These constructions are shown in FIGS. 12 and 7, respectively. A fourth motor construction is a 6:8 construction shown in FIG. 13, and a 12:16 construction (n=2) in FIG. 14. In general, the formula for the motor stator/rotor pole ratio can be given as 6(n):2(n); 6(n):4(n); 6(n):8(n); or 8(n):6(n), 8(n):10(n), where n is a positive, whole integer having a value of 1 or 2. Specifically, in the 6(n):2(n) construction, n may be 1, 2, 3, or 4; for the 6(n):8(n) construction, n=2, 3, 4; and for the 8(n):10(n) construction, n=1, 2, 3, 4.

While respect to rotor assembly construction, if the stator assembly has only one tooth per pole, then the rotor teeth have a step gap construction to improve starting torque in the desired direction of rotation. If the stator poles have two teeth per pole, then it is important that the rotor have a prescribed number of required teeth based upon the above formula. In order to improve starting torque in a desired direction of motor rotation, the rotor teeth should overlap the stator teeth of other phase poles when one phase is at maximum inductance. The number of rotor teeth is limited by the ability to construct a stator having the appropriate calculated spacing between stator teeth. Thus, as indicated the spacing formula, so long as the result of the spacing calculation exceeds approximates, and is preferably less than that given by the formula:

$$\frac{360}{ph * (p/ph)} * 0.5,$$

the selected number of rotor teeth is the most practical for motor construction.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. A multi-phase switched reluctance motor comprising:
   a stator assembly having a number of stator poles, including redundant poles, for each motor phase; and,
   a rotor assembly mounted for rotation with respect to said stator assembly, said rotor assembly also having a number of poles for each motor phase, the motor having a stator pole/rotor pole ratio, including the redundant stator poles, which is one of the following: ((6:2)×n) where n is a positive whole integer, ((6:8)×n) where n is a positive whole integer greater than 1, and ((8:10)×n), where n is a positive whole integer, whereby the motor has quiet start-up capability and is a quietly running motor.

2. The multi-phase switched reluctance motor of claim 1 which is a three-phase motor.

3. The multi-phase switched reluctance motor of claim 1 which is a four-phase motor.

4. The multi-phase switched reluctance motor of claim 1 wherein the stator assembly has a plurality of stator teeth for each stator pole.

5. The multi-phase switched reluctance motor of claim 4 wherein each rotor pole has at least one associated rotor tooth.

6. The multi-phase switched reluctance motor of claim 5 wherein each rotor tooth is contoured to form a stepped air gap on each side of the tooth to facilitate motor rotation in either direction.

7. The multi-phase switched reluctance motor of claim 1 wherein n for a 6:2 ratio motor has a value of 1, 2, 3, or 4.

8. The multi-phase switched reluctance motor of claim 1 wherein n for a 6:4 ratio motor has a value of 1 or 2.

9. The multi-phase switched reluctance motor of claim 1 wherein n for a 6:8 ratio motor is 1 or 2.

10. The multi-phase switched reluctance motor of claim 1 wherein n for an 8:6 ratio motor is 1 or 2.

11. The multi-phase switched reluctance motor of claim 1 wherein n for an 8:10 ratio motor has a value of 1, 2, 3, or 4.

12. The multi-phase switched reluctance motor of claim 5 wherein the rotor teeth each have a first section and a second section, the first said section defining a first air gap between said stator assembly and said rotor assembly, and said second section defining a second air gap therebetween, the arc of each rotor tooth being greater than the arc of each stator pole.

13. The switched reluctance motor of claim 1 wherein said rotor section has a central opening therein and said stator is disposed in said central opening.

14. A multi-phase switched reluctance motor comprising a stator assembly having a number of stator poles for each motor phase, and a rotor assembly mounted for rotation with respect to said stator assembly and also having a number of poles for each motor phase, the rotor assembly including a plurality of rotor teeth each of which has a first tooth section defining a first air gap between the stator and rotor assemblies, and a second section defining a second air gap therebetween, and the motor having a stator pole/rotor pole ratio which is one of 6(n):4(n); or 8(n):6(n) wherein n is a positive, whole integer having a value of at least three.

15. The switched reluctance motor of claim 14 wherein n has a value of 3, 4, or 5.

16. The switched reluctance motor of claim 15 wherein a three-phase motor.

17. A multi-phase, bi-directional switched reluctance motor comprising:
a stator assembly having a plurality of stator poles including redundant poles for each motor phase; and,
a rotor assembly having a plurality of rotor poles for each motor phase, the rotor assembly being disposed for rotation with respect to the stator assembly, the stator assembly and rotor assembly having a stator pole (including redundant poles)/rotor pole ratio which is one of 6(n):2(n) where n has a value of 1, 2, 3, or 4, 6(n):8(n) where n has a value of 1 or 2, or 8(n):10(n) where n has a value of 1, 2, 3, or 4, and each rotor pole has at least one associated rotor tooth, each rotor tooth being contoured to form a stepped air gap on each side of the tooth thereby to facilitate motor rotation in either direction, the arc of each rotor tooth exceeding the arc of each stator pole.

18. The motor of claim 17 wherein the motor is a three-phase motor.

19. The motor of claim 17 wherein the spacing between rotor teeth is determined by the formula $$\frac{360 - (360/N) * ph * (p/ph)}{ph * (p/ph)} ((360/N) * X)$$

where 360 is the number of degrees in a circle, N the number of rotor teeth, ph the number of phases, p/ph the number of poles per phase, and X is a ratio of tooth width to to tooth pitch and has a desired range of 0.3–0.4.

20. The motor of claim 17 wherein the stator pole/rotor pole ratio is also one of 6(n):4(n) or 8(n):6(n) where n has a value of 1.

* * * * *